United States Patent

Treherne et al.

[15] 3,645,329

[45] Feb. 29, 1972

[54] ELECTRON TUBE COOLING SYSTEM

[72] Inventors: Thomas Harvey Treherne, Brixham; Ewart Peter Coote, Paignton, both of England

[73] Assignee: International Standard Electric Corporation, New York, N.Y.

[22] Filed: Feb. 11, 1970

[21] Appl. No.: 10,541

[30] Foreign Application Priority Data

Feb. 19, 1969  Great Britain..........................8,944/69

[52] U.S. Cl............................................................165/105
[51] Int. Cl..............................................................F28d 15/00
[58] Field of Search ........................................165/74, 105, 80

[56] References Cited

UNITED STATES PATENTS 3,388,740  6/1968  O'Loughlin..............................165/105

*Primary Examiner*—Charles Sukalo
*Attorney*—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

In a water-cooling system for a high-power electron tube, some of the water used for cooling the tube body is fed from an intermediate supply vessel to a boiler in which an electrode of the tube is cooled by evaporation of the water. The water level in the boiler is controlled by an overflow outlet of the intermediate supply vessel. The supply vessel is fed with water via a weir, or an equivalent thereof, providing water at or above the level of the overflow outlet of the vessel. The weir may be provided with means to reduce the speed and the turbulence of the water entering the vessel. The interconnection between the vessel and the boiler is located at a depth below the level of the overflow outlet and is also provided with means to reduce agitation of the water in the boiler and backflow of the water from the boiler to the vessel.

11 Claims, 3 Drawing Figures

Inventors
THOMAS H. TREHERNE
EWART P. COOTE
By Edward Goldberg
Attorney 3,645,329

ELECTRON TUBE COOLING SYSTEM

BACKGROUND OF THE INVENTION

1. Field of the Invention

The present invention relates to a boiler feed system, and more particularly, to an improvement in a boiler feed system for the evaporative cooling of an electron discharge tube.

2. Description of the Prior Art

In a vapor-cooling system for a high-power electron discharge tube, an anode or electron collector electrode forming an end portion of the envelope of the device is immersed in a boiler and cooled during operation by evaporation of the coolant in the boiler. Arrangements have to be made to maintain the correct level of coolant It is common practice to use a closed system for circulating the coolant, vapor being condensed and returned to a reservoir from which supplies of coolant are fed into the boiler. In a high-power tube such as a klystron, it is common to provide evaporation cooling for the electron collector electrode and to cool other parts of the tube by circulating water. The amount of water required to be circulated for cooling these other parts exceeds the amount needed to maintain the desired water level the boiler. However, such a cooling system had a shortcoming in that when the klystron was shut down, even temporarily, water tended to flow back into the vessel from the boiler. The overflow tended to heat up the water to an unduly high temperature. Moreover, a certain amount of time is required to refill the boiler before the klystron can be started again, resulting in a delay in start up time.

SUMMARY OF THE INVENTION

It is therefore an object of the present invention to provide an improved boiler feed system.

It is another object of the present invention to provide a boiler feed system that overcomes the aforementioned shortcomings of the coolant flowing back into the vessel from the boiler.

It is still another object of the present invention to minimize turbulence of the coolant in the boiler which otherwise assists backflow of the hot coolant into the vessel from the boiler.

According to the present invention there is provided a boiler feed system wherein coolant to be evaporated in a boiler is fed from a source to the boiler through a supply vessel having an overflow outlet determining the quiescent level of coolant in the boiler and wherein coolant is fed into the supply vessel at a level at or above the level of the overflow outlet.

In accordance with one feature of the present invention, means are provided to minimize turbulence and backflow of the coolant into the vessel from the boiler.

In accordance with another feature of the present invention, means are provided to reduce the speed and the turbulence of water entering into the supply vessel.

The foregoing and other objects and features of the present invention will be more fully understood from the following detailed description in conjunction with the accompanying drawings.

DETAILED DESCRIPTION OF PREFERRED EMBODIMENTS

Figure 1:
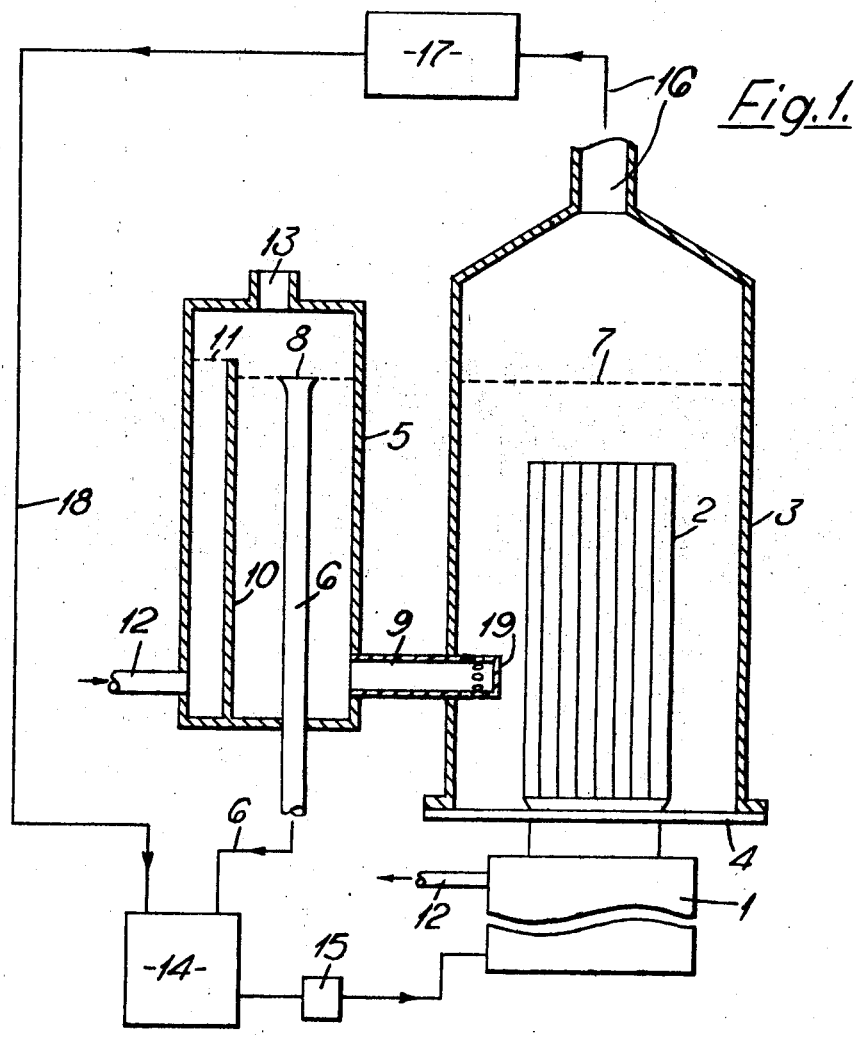
FIG. 1 illustrates diagrammatically a preferred cooling system according to the invention.

In FIG. 1 a klystron having a body portion 1 and, at one end of the klystron, an electron collector electrode 2, is represented diagrammatically with the collector electrode within a boiler 3 which seats upon and is secured by bolts (not shown) to a flange 4 of the klystron. The boiler is supplied with water, immersing the collector electrode, from a supply vessel 5, of rectangular cross section in the present embodiment. The supply vessel is fitted with an overflow pipe 6 and is fed with more water than is required to be supplied to the boiler, the quiescent water level in the boiler—that is the water level before boiling occurs—indicated at 7, being thus maintained at the level of the lip 8 of the overflow pipe 6. An interconnection pipe 9 between the supply vessel and the boiler is provided well below the level of the overflow outlet, as will be discussed further below. A baffle plate 10 extends between opposite sidewalls of the supply vessel and is spaced parallel to a third wall to form a weir over the nappe 11 of which inlet water to the supply vessel flows from a feed pipe 12. The nappe of the weir is at a level above the overflow outlet. The supply vessel is open to atmospheric pressure at a vent 13.

The remaining parts of the cooling system will now be briefly described. Water from a reservoir 14 is fed by a pump 15 through water-cooling arrangements, not separately shown, for the body 1 of the klystron from which it emerges into the feed pipe 12 of the supply vessel 5. As stated before, more water is required for cooling the body of the klystron than for replacing that lost in the boiler. The surplus liquid is returned by the overflow pipe 6 to the reservoir 14.

During operation of the klystron, cooling of the collector electrode 2 is effected by evaporation of the coolant in the boiler. Steam passes out of the boiler through a steam pipe 16 to a condenser 17 from which the condensate is fed back to the reservoir through a return line 18. The steam pressure above the level of liquid in the boiler is normally but little above atmospheric. If it is desired to work at a higher steam pressure, the vent 13 in the supply vessel is connected to a source of air pressure equal to that of the desired steam pressure.

In the drawing, only the main components of the cooling system apart from the boiler and its supply vessel are shown. In practice, various interlocks, monitoring and other arrangements are included, with which the present invention is not concerned.

The arrangement of the weir and overflow in the supply vessel 5 ensures that, in the event of a shutdown which includes stoppage of the feed water supply to the vessel 5, the water in the boiler and the supply vessel cannot drain or leak away through the feed pipe 12. Thus the water level in the boiler will not be substantially reduced during the shutdown period and sufficient water will remain to allow the system to be started up again immediately without having to refill the boiler and supply vessel.

The feed pipe is supplied with water by the pump 15. The baffle 10 serves to reduce the velocity of flow over the nappe 11 to less than the input velocity at 12 and also to smooth out pulsation due to the pump action and reduce turbulence in the main body of water in the supply vessel to a minimum. The interconnection pipe 9 is sufficiently below the level of the overflow to ensure that any turbulence is substantially eliminated. The pipe 6 is bell molded or is otherwise provided with an enlarged mouth portion to give a smooth and unrestricted overflow.

It is important that water flowing into the boiler should not set up agitation. Backflow of hot water from the boiler into the supply vessel 5 should be prevented as far as possible. To this end the connection 9 terminates in a reentrant tube orifice which may be covered by a diffuser nozzle 19, so as to provide a low coefficient of discharge from the connection pipe. Formula for dimensioning the reentrant tube orifice and for the dimensioning of the bell mouth of the pipe 6 and of the weir portion of the supply vessel are to be found in standard engineering handbooks.

The boiler feed system described above, dimensioned appropriately to the rate of flow in the feed pipe 12 and the size and dissipation of the electron collector electrode, provides a boiler water feed from which agitation and turbulence is largely eliminated while maintaining a constant water level within the boiler during normal operation and obviates delay in starting up after a shutdown of the electrical part of the klystron system.

In the embodiment of FIG. 1 coolant is fed into the supply vessel over a weir formed by the baffle plate 10. This arrangement is convenient with a supply vessel of rectangular cross section, but alternatives are available. In the simplest case the requirement that the inlet to the supply vessel should be above the level of the overflow outlet would be satisfied by making the entry of feed pipe 12 near the top of the vessel, above the level of the lip 8 of the overflow pipe; the baffle 10 could then be omitted. This simple arrangement may not in all cases provide a sufficient velocity reduction and freedom from pulsation of the inlet flow and alternative arrangements now to be described may be preferred.

Figure 2:
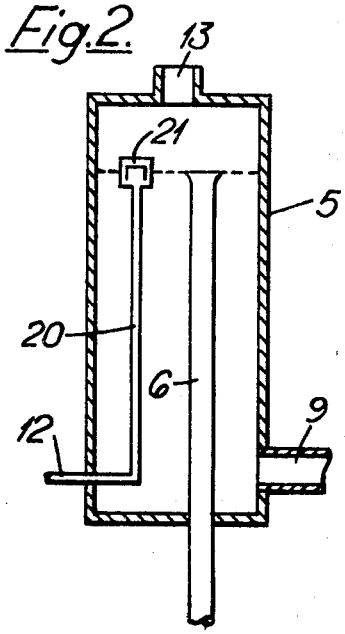
FIGS. 2 and 3 illustrate alternative arrangements for the coolant supply vessel of FIG. 1.
Figure 3:
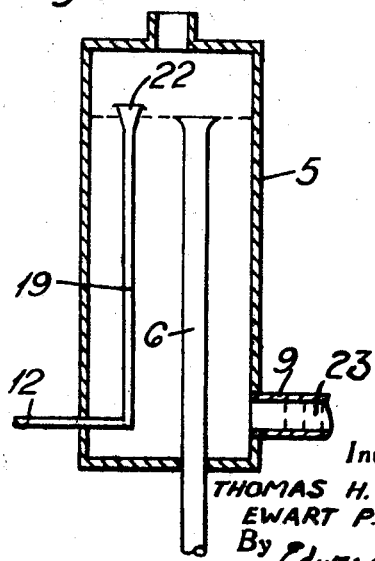

In FIG. 2 the feed pipe 12 is continued inside the vessel 5 as a standpipe 20 terminating in a diffuser 21 having circumferential outlet orifices at approximately the level of the overflow outlet from the supply vessel. In FIG. 3 a similar standpipe arrangement is used, but in place of the diffuser 21 the standpipe is made somewhat longer and terminates in a mouth portion 22 of wider cross section whose rim is above the level of the overflow outlet from the supply vessel.

FIG. 3 also shows an alternative arrangement for the interconnection pipe 9. Instead of providing a diffuser nozzle inside the boiler to reduce agitation and backflow, the interconnection pipe contains restrictions in the form of annular baffle plates 23.

It is to be understood that the foregoing description of specific examples of this invention is not to be considered as a limitation of its scope.

We claim:

1. A cooling system comprising:
   means for supplying a coolant;
   an evaporative cooling boiler for receiving said coolant; and
   a supply vessel having an inlet for said coolant from said supplying means, an overflow outlet, and an interconnection between said supply vessel and said boiler, said overflow outlet being positioned between said inlet and said interconnection and said inlet being positioned at a predetermined level with respect to the level of the overflow outlet to prevent backflow of the coolant from said boiler to said supplying means;
   the level of the overflow outlet determining the quiescent level of the coolant in said boiler.

2. A system in accordance with claim 1, wherein said inlet is positioned at a level above that of said overflow outlet and at a side of said supply vessel opposite that of said interconnection.

3. A system in accordance with claim 1, comprising: a supply pipe connected to the inlet of said supply vessel at a side of said supply vessel opposite that of said interconnection, the inlet having means to reduce velocity of the coolant entering said supply vessel compared to the velocity of the coolant in said supply pipe.

4. A system in accordance with claim 3 wherein said supply pipe is connected to said supply vessel at a level below the level of the inlet and overflow outlet, and the inlet includes a diffuser head whose outlet orifices are approximately at the level of the overflow outlet so as to reduce turbulence of the coolant in said supply vessel.

5. A system in accordance with claim 3 wherein said supply pipe is connected to said supply vessel at a level below the level of the inlet and overflow outlet, and the inlet is dimensioned to have a cross section larger than that of said supply pipe to reduce velocity of the coolant entering said supply vessel.

6. A system in accordance with claim 2, wherein the inlet for said supply vessel includes a weir having a baffle plate enclosing a portion of said supply vessel and a nappe located at a level above the overflow outlet for reducing the velocity of the coolant entering said supply vessel from said supply source.

7. A system in accordance with claim 6, wherein the overflow outlet of said supply vessel includes a vertical pipe having an enlarged mouth portion to provide a smooth and unrestricted overflow of the coolant.

8. A system in accordance with claim 2 including a boiler, wherein said interconnection between said vessel and said boiler is located at a depth below the level of the overflow outlet sufficient during the normal operation of the system to eliminate substantially the pulsation and the turbulence of the coolant.

9. A system in accordance with claim 8, wherein said interconnection includes means for reducing the velocity of flow of the coolant therethrough to hinder agitation of the coolant in said boiler and backflow of the coolant from said boiler to said supply vessel.

10. A system in accordance with claim 9, wherein said reducing means includes a reentrant orifice terminating within said boiler.

11. A system in accordance with claim 10, wherein said reducing means further includes a diffusion nozzle covering said reentrant orifice.

* * * * *